United States Patent
Ma et al.

(10) Patent No.: US 11,907,503 B2
(45) Date of Patent: Feb. 20, 2024

(54) SWITCHING DISPLAY OF PAGE BETWEEN A WINDOW OF A GRAPHICAL USER INTERFACE AND AN INDEPENDENT CHILD WINDOW

(71) Applicant: BOE TECHNOLOGY GROUP CO., LTD., Beijing (CN)

(72) Inventors: Huiguang Ma, Beijing (CN); Liping Lei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/641,454

(22) PCT Filed: Mar. 1, 2021

(86) PCT No.: PCT/CN2021/078501
§ 371 (c)(1),
(2) Date: Mar. 9, 2022

(87) PCT Pub. No.: WO2022/183331
PCT Pub. Date: Sep. 9, 2022

(65) Prior Publication Data
US 2023/0152945 A1    May 18, 2023

(51) Int. Cl.
*G06F 3/0483* (2013.01)
*G06F 3/04845* (2022.01)

(52) U.S. Cl.
CPC ........ *G06F 3/0483* (2013.01); *G06F 3/04845* (2013.01)

(58) Field of Classification Search
None
See application file for complete search history.

(56) References Cited

U.S. PATENT DOCUMENTS 5,572,649 A * 11/1996 Elliott ............... G06F 3/0481
715/788
10,176,154 B2 * 1/2019 Ben-Aharon ....... G06F 16/9577
10,761,673 B2   9/2020 Musa et al.
(Continued)

FOREIGN PATENT DOCUMENTS

CN    103986961 A  *  8/2014
CN    105933779 A     9/2016
(Continued)

OTHER PUBLICATIONS

Written Opinion from PCT/CN2021/078501 dated Nov. 26, 2021.
(Continued)

*Primary Examiner* — Mandrita Brahmachari
(74) *Attorney, Agent, or Firm* — Calfee, Halter & Griswold LLP

(57) ABSTRACT

An interface display method and apparatus, a computer readable storage medium and an electronic device. The above method includes: responding to a first triggering operation for a first target page in a window of a graphical user interface, acquiring a first parent layout of the first target page; removing a root layout of the first target page from the first parent layout; creating a child window displayed independently of the window; and switching the first target page to be displayed in the child window by adding the root layout of the first target page to the child window.

20 Claims, 4 Drawing Sheets

S510 — Acquire a second parent layout that is pre-created for the root layout of the first target page and is in the child window S520 — Add the root layout of the first target page to the second parent layout to generate a target parent layout S530 — Add the target parent layout to the child window, to add the root layout of the first target page to the child window

(56) References Cited

U.S. PATENT DOCUMENTS

| | | | |
|---|---|---|---|
| 10,838,614 B2 | 11/2020 | Storr et al. | |
| 2009/0063556 A1* | 3/2009 | Nemoto | G06F 16/119 |
| 2014/0096158 A1 | 4/2014 | Chao | |
| 2014/0282213 A1 | 9/2014 | Musa et al. | |
| 2015/0074516 A1* | 3/2015 | Ben-Aharon | G06F 40/143 |
| | | | 715/234 |
| 2017/0024362 A1* | 1/2017 | Borders | G06F 40/14 |
| 2018/0121217 A1* | 5/2018 | Jarabek | G06F 9/546 |
| 2019/0302981 A1 | 10/2019 | Storr et al. | |
| 2021/0049222 A1* | 2/2021 | Pascente | G06F 16/9535 |
| 2021/0089181 A1 | 3/2021 | Storr et al. | |

FOREIGN PATENT DOCUMENTS

| | | | | |
|---|---|---|---|---|
| CN | 106028143 A | | 10/2016 | |
| CN | 106131686 A | | 11/2016 | |
| CN | 106803978 A | | 6/2017 | |
| CN | 108279835 A | * | 7/2018 | G06F 3/0481 |
| CN | 108366301 A | | 8/2018 | |
| CN | 108509229 A | | 9/2018 | |
| CN | 108920240 A | | 11/2018 | |
| CN | 109445879 A | | 3/2019 | |
| CN | 106131686 B | | 6/2019 | |
| CN | 111726456 A | | 9/2020 | |
| CN | 112099617 A | | 12/2020 | |
| CN | 108509229 B | | 5/2021 | |
| EP | 3550416 A1 | | 10/2019 | |
| WO | 2018/001202 A1 | | 1/2018 | |
| WO | 2018/001218 A1 | | 1/2018 | |

OTHER PUBLICATIONS

Article "Android imitation Youku video floating window playback effect", dated Oct. 16, 2020, 6 pgs.

Article "Android video player realizes switching between small window and full screen state", dated May 27, 2016, 11 pgs.

Article Summary of video playback technologies (list playback, small window playback, cross-interface playback, network switching prompts during playback), dated Nov. 12, 2017, 22 pgs.

Article "Android floating window usage", dated Jan. 16, 2018, 9 pgs.

* cited by examiner

SWITCHING DISPLAY OF PAGE BETWEEN A WINDOW OF A GRAPHICAL USER INTERFACE AND AN INDEPENDENT CHILD WINDOW

CROSS-REFERENCE

This application is a U.S. national stage of International Application No. PCT/CN2021/078501, filed Mar. 1, 2021, the disclosure of which is hereby incorporated by reference in its entirety.

TECHNICAL FIELD

The present disclosure relates to the field of computer technologies, and in particular, to an interface display method, an interface display apparatus, a computer-readable storage medium, and an electronic device.

BACKGROUND

In the related art, when a view in a page of a graphical user interface is switched to be displayed on a floating window or a view in the floating window is switched to be displayed in the page of the graphical user interface, the original view is first destroyed and then a view is re-created.

However, such process of destroying and re-creating may cause the computer memory resources occupied and consumed, thereby reducing an operating speed of the system.

It should be noted that the information disclosed in the Background section above is only for enhancing the understanding of the background of the present disclosure, and thus may include information that does not constitute prior art known to those of ordinary skilled in the art.

SUMMARY

The present disclosure provides an interface display method, an interface display apparatus, a computer-readable storage medium, and an electronic device.

According to a first aspect of the present disclosure, there is provided an interface display method, including:
responding to a first triggering operation for a first target page in a window of a graphical user interface, acquiring a first parent layout of the first target page;
removing a root layout of the first target page from the first parent layout;
creating a child window displayed independently of the window; and
switching the first target page to be displayed in the child window by adding the root layout of the first target page to the child window.

In some embodiments of the present disclosure, based on the foregoing solution, before responding to the first triggering operation for the first target page in the window of the graphical user interface, the method further includes:
generating the root layout of the first target page;
configuring a layout corresponding to the first target page in the root layout to display the first target page in the window of the graphical user interface according to the layout corresponding to the first target page.

In some embodiments of the present disclosure, based on the foregoing solution, the adding the root layout of the first target page to the child window includes:
acquiring a second parent layout that is pre-created for the root layout of the first target page and is in the child page;
generating a target parent layout by adding the root layout of the first target page to the second parent layout; and
adding the root layout of the first target page to the child window by adding the target parent layout to the child window.

In some embodiments of the present disclosure, based on the foregoing solution, the adding the root layout of the first target page to the child window includes:
acquiring a second parent layout that is pre-created for the root layout of the first target page and is in the child page;
adding the second parent layout to the child window; and
adding the root layout of the first target page to the second parent layout.

In some embodiments of the present disclosure, based on the foregoing solution, the switching the first target page to be displayed in the child window includes:
switching the first target page to be displayed in the child window according to a pre-configured display size of the first target page in the child window.

In some embodiments of the present disclosure, based on the foregoing solution, the creating the child window displayed independently of the window includes:
acquiring an initial display position and an initial display size of the child window; and
creating the child window displayed independently of the window at the initial display position according to the initial display size.

In some embodiments of the present disclosure, based on the foregoing solution, after switching the first target page to be displayed in the child window, the method further includes:
in response to a position movement operation and/or a size adjustment operation for the child window, adjusting a display position and/or a display size of the child window in the graphical user interface.

In some embodiments of the present disclosure, based on the foregoing solution, the method further includes:
recording the adjusted display position and/or the adjusted display size of the child window in the graphical user interface; and
updating the initial display position and/or the initial display size of the child window according to the adjusted display position and/or the adjusted display size.

In some embodiments of the present disclosure, based on the foregoing solution, the creating the child window displayed independently of the window includes:
creating multiple child windows displayed independently of the window;
the adding the root layout of the first target page to the child window includes:
adding the root layout of the first target page to each of the child windows.

In some embodiments of the present disclosure, based on the foregoing solution, the method further includes:
in response to an editing operation for any of the child windows, determining target display information corresponding to the editing operation; and
synchronously displaying the target display information in other child windows.

In some embodiments of the present disclosure, based on the foregoing solution, the switching the first target page to be displayed in the child window includes:
acquiring a first display state in the child window that is pre-configured for each control in a layout of the first target page; and switching the first target page to be displayed in the child window according to the first display state of each control in the child window.

In some embodiments of the present disclosure, based on the foregoing solution, after switching the first target page to be displayed in the child window, the method further includes:

in response to a second triggering operation for a preset control in the child window, acquiring a second display state that is pre-configured for each control in a layout of the first target page and is associated with the preset control in the child window; and updating a page displayed in the child window according to the second display state of each control in the child window.

In some embodiments of the present disclosure, based on the foregoing solution, after switching the first target page to be displayed in the child window, the method further includes:

in response to a third triggering operation for a second target page in the child window, acquiring the second parent layout of the second target page in the child window;

removing a root layout of the second target page in the child window from the second parent layout; and switching the second target page in the child window to be displayed in the window of the graphical user interface by adding the root layout of the second target page in the child window to the first parent layout.

In some embodiments of the present disclosure, based on the foregoing solution, the switching the second target page in the child window to be displayed in the window of the graphical user interface includes:

acquiring a third display state of each control, in the layout corresponding to the first target page, in the window of the first target page; and switching the second target page in the child window to be displayed in the window of the graphical user interface according to the third display state of each control in the window of the first target page.

In some embodiments of the present disclosure, based on the foregoing solution, any one of the triggering operations includes at least one of a touch operation, a voice operation, and a gesture operation.

According to a second aspect of the present disclosure, there is provided an interface display method, including:

in response to a fourth triggering operation for a third target page in a floating window of a graphical user interface, acquiring a third parent layout of the third target page;

removing a root layout of the third target page from the third parent layout;

creating a target window corresponding to the floating window; and switching the third target page to be displayed in the target window by adding the root layout of the third target page to the target window.

In some embodiments of the present disclosure, based on the foregoing solution, the acquiring the third parent layout of the third target page includes:

acquiring a third parent layout that is pre-created for the root layout of the third target page and is in the floating window.

In some embodiments of the present disclosure, based on the foregoing solution, the switching the third target page to be displayed in the target window includes:

acquiring a pre-configured fourth display state in the target window of each control in a layout corresponding to the third target page; and switching the third target page to be displayed in the target window according to the fourth display state of each control in the target window.

In some embodiments of the present disclosure, based on the foregoing solution, after switching the third target page to be displayed in the target window, the method further includes:

in response to a fifth triggering operation for a fourth target page in the target window, acquiring a fourth parent layout of the fourth target page in the target window;

removing a root layout of the fourth target page in the target window from the fourth parent layout; and switching the fourth target page in the target window to be displayed in the floating window by adding the root layout of the fourth target page in the target window to the third parent layout.

In some embodiments of the present disclosure, based on the foregoing solution, the switching the fourth target page in the target window to be displayed in the floating window includes:

acquiring a fifth display state of each control in the layout corresponding to the third target page in the floating window; and switching the fourth target page to be displayed in the floating window according to the fifth display state of each control in the floating window.

According to a third aspect of the present disclosure, there is provided an interface display apparatus, including:

a first parent layout acquiring module, configured to, responding to a first triggering operation for a first target page in a window of a graphical user interface, acquire a first parent layout of the first target page;

a first removing module, configured to remove a root layout of the first target page from the first parent layout;

a child window creating module, configured to create a child window displayed independently of the window; and a first switching and displaying module, configured to add the root layout of the first target page to the child window to switch the first target page to be displayed in the child window.

According to a fourth aspect of the present disclosure, there is provided an interface display apparatus, including:

a third parent layout acquiring module, configured to, in response to a fourth triggering operation for a third target page in a floating window of a graphical user interface, acquire a third parent layout of the third target page;

a second removing module, configured to remove a root layout of the third target page from the third parent layout;

a target window creating module, configured to create a target window corresponding to the floating window; and a second switching and displaying module, configured to add the root layout of the third target page to the target window to switch the third target page to be displayed in the target window.

According to a fifth aspect of the present disclosure, there is provided a computer-readable storage medium on which a computer program is stored, wherein the program, when executed by a processor, implement the interface display method described in the first aspect and/or the interface display method described in the second aspect in the foregoing embodiments.

According to a sixth aspect of the embodiments of the present disclosure, there is provided an electronic device, including: a processor; and, a storage device, configured to store one or more programs, wherein the one or more programs, when executed by the one or more processors, cause one or more processors to implement the interface display method described in the first aspect and/or the interface display method described in the second aspect in the foregoing embodiments.

It should be noted that the above general description and the following detailed description are merely exemplary and explanatory and should not be construed as limiting of the disclosure.

BRIEF DESCRIPTION OF THE DRAWINGS

The drawings here are incorporated into the specification and constitute a part of the specification, show embodiments in accordance with the present disclosure, and are used together with the specification to explain the principle of the present disclosure. Apparently, the drawings in the following description are only some embodiments of the present disclosure. For those of ordinary skill in the art, other drawings can be acquired based on these drawings without creative work.

DETAILED DESCRIPTION

Figure 1:
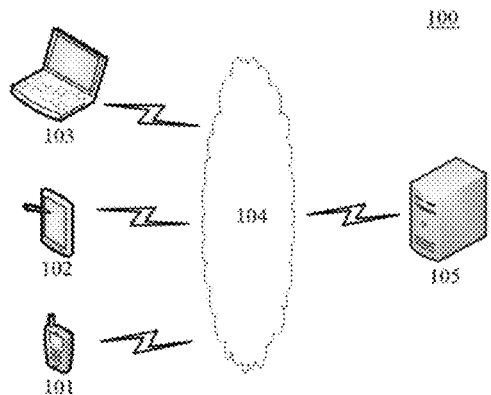
FIG. 1 shows a schematic diagram of an exemplary system architecture to which an interface display method and apparatus of an embodiment of the present disclosure can be applied.

Exemplary embodiments will now be described more fully with reference to the accompanying drawings. However, the embodiments can be implemented in a variety of forms and should not be construed as being limited to the examples set forth herein; rather, these embodiments are provided so that the present disclosure will be more full and complete so as to convey the idea of the exemplary embodiments to those skilled in this art. The described features, structures, or characteristics may be combined in any suitable manner in one or more embodiments. In the following description, many specific details are provided to give a full understanding of the embodiments of the present disclosure. However, those skilled in the art will appreciate that the technical solution of the present disclosure may be practiced without one or more of the specific details, or other methods, components, apparatuses, steps and the like may be employed. In other instances, well-known technical solution are not shown or described in detail to avoid obscuring various aspects of the present disclosure.

The terms "one", "a", "the", and "said" are used in the present specification to indicate that there are one or more elements/components or the like; the terms "include" and "have" are used to indicate an open meaning of including and means that there may be additional elements/components/etc. in addition to the listed elements/components/etc.; the terms "first" and "second" etc. are used only as markers, and do not limit the number of objects.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities.

FIG. 1 is a schematic diagram illustrating a system architecture of an exemplary application environment in which an interface display method and apparatus of an embodiment of the present disclosure can be applied.

As shown in FIG. 1, a system architecture 100 may include multiple terminal devices 101, 102, and 103, a network 104 and a server 105. The network 104 is used to provide a medium for communication links between the terminal devices 101, 102, 103 and the server 105. The network 104 may include various connection types, such as wireless communication links and the like.

It should be understood that the number of terminal devices, networks, and servers in FIG. 1 are merely illustrative. According to implementation needs, there can be any number of mobile terminals, networks, and servers. For example, the server 105 may be a server cluster composed of multiple servers or the like.

The terminal devices 101, 102, 103 may be various electronic devices with processors and displays, including but not limited to smart phones, tablet computers, computers, and so on. The server 105 may be a server that provides various services.

For example, when a first target page in a window of a graphical user interface is a web (World Wide Web) page, responding to a first triggering operation for a first web page in a window of a graphical user interface of the terminal device 101, 102, 103, the server 105 can acquire a first parent layout of the first web page, remove a root layout of the first web page from the first parent layout, create a child window displayed independently of the window of the graphical user interface in the graphical user interface of the terminal device 101, 102, 103 and add the root layout of the first web page to the child window, so that the first web page is switched to be displayed in the created child window displayed independently of the window of the graphical user interface.

The window of the graphical user interface includes an area occupied by any visual view in the graphical user interface. Taking an Android operating system as an example, the window of the graphical user interface may include an application window in the Android operating system or a child window that has to be dependent on a certain parent window. The child window displayed independently of the window of the graphical user interface may include a system window in the Android operating system. Specifically, the system window may include a window that is created by a system process, and exists independently without depending on any application or any parent window, such as a floating window.

For another example, in response to a second triggering operation for a second web page in the floating window of the terminal device 101, 102, 103, the server 105 may acquire a second parent layout of the second web page in the floating window, remove a root layout of the second web page in the floating window from the second parent layout, and then add the root layout of the second web page in the floating window to the aforementioned first parent layout, so that the second web page in the floating window is switched to be displayed in the window of the graphical user interface.

It should be noted that display contents of the first web page and the second web page are the same, but controls and positions of the controls in the pages may be the same or different. Taking the first web page as a page in a video website as an example, both the first web page and the second web page display video A, but controls that can operate video A and positions of the controls in the first web page and the second web page may be the same or different. For example, there can be a pause button in the first web page, and there can be no pause button in the second web page; a fast forward button in the first web page is at the top left of the window, and a fast forward button in the second web page is at the lower left of the child window independent of the window.

When the first target page in the window of the graphical user interface is a local client page, an interface display method according to the present disclosure may be directly executed through the local client without using the network 104 and the server 105. In this case, the interface display method may be implemented in a specific manner same as the specific manner when the first target page is the web page, with the server in the foregoing embodiment being replaced with the local client, the first web page being replaced with a first local client page and the second web page being replaced with a second local client page.

For example, responding to a first triggering operation in the first local client page in the window of the graphical user interface of the terminal device 101, 102, 103, the local client can acquire a first parent layout of the first local client page, remove a root layout of the first local client page from the first parent layout, create a child window displayed independently of the window of the graphical user interface in the graphical user interface of the terminal device 101, 102, 103, and add the root layout of the first local client page to the created child window, so that the first local client page is switched to be displayed in the created child window displayed independently of the window of the graphical user interface.

Figure 2:
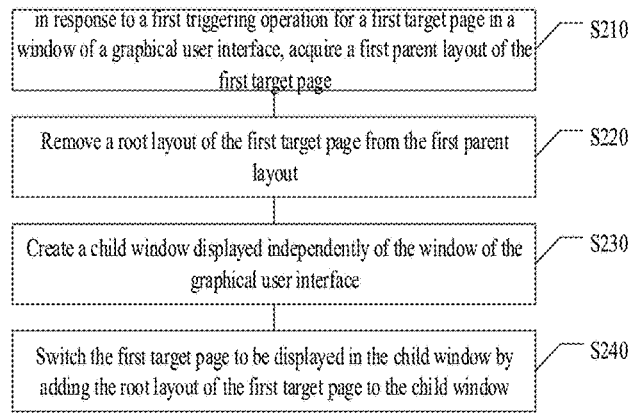
FIG. 2 is a schematic flowchart of an interface display method in some embodiments of the present disclosure.

FIG. 2 is a schematic flowchart of an interface display method in some embodiments of the present disclosure. The interface display method provided by this embodiment is applied to the terminal device. A display screen of the terminal device includes a graphical user interface including a first target page. Referring to FIG. 2, the method includes steps described below.

In step S210, responding to a first triggering operation in the first target page in a window of the graphical user interface, a first parent layout of the first target page is acquired.

In step S220, a root layout of the first target page is removed from the first parent layout.

In step S230, a child window displayed independently of the window of the graphical user interface is created.

In step S240, the root layout of the first target page is added to the child window, so as to switch the first target page to be displayed in the child window.

In the technical solution provided by the embodiment shown in FIG. 2, first, in response to the first triggering operation for the first target page in the window of the graphical user interface, the first parent layout of the first target page is acquired, and the root layout of the first target page is removed from the first parent layout; the child window displayed independently of the window of the graphical user interface is then created, and the root layout of the first target page is added to the child window, so that the first target page is switched to be displayed in the child window. Compared with the related art, in one hand, though the above page switching and displaying manner, the first target page is first removed from the first parent layout, and then the root layout of the first target page is added to the created child window displayed independently of the window, thus the process of destroying and re-creating the view during the switching display can be avoided, the computer memory resources occupied and consumed during the page switching and displaying process are reduced, and the computer's operating speed during the page switching and displaying process is improved; in another hand, based on the switching display manner through removal and addition, the switching efficiency can be improved, the display fluency during the switching and displaying process can be improved, thereby realizing the uninterrupted switching display.

Specific implementations of each step in the embodiment shown in FIG. 2 are described in detail below.

In step S210, in response to the first triggering operation for the first target page in the window of the graphical user interface, the first parent layout of the first target page is acquired.

As mentioned above, the window of the graphical user interface includes a display area corresponding to the visual view in the graphical user interface. Taking the Android (Android view) operating system as an example, the window of the graphical user interface may include an application window in the Android operating system or a child window that has to be dependent on a certain parent window. Each application window can correspond to an Activity (an active component), that is, the application window is a window created in the Activity. The parent window, on which the child window that has to be dependent on the certain parent window is dependent, can be the application window or another type of window.

The first target page may include a page in the application window in the Android operating system or a page in the child window that has to be dependent on the certain parent window.

For example, the first target page can include any application page, such as a page in a video player, a page in a drawing software, a page in an office software used for operations such as word processing, table making, slide making, graphics and image processing, simple database processing, etc. The display content in the first target page may be dynamic, such as videos, etc., or static, such as pictures, tables, texts, etc.

In some embodiments, the first triggering operation is an operation of controlling the first target page to be switched and displayed in a created child window displayed independently of the window where the first target page is located, and such operation includes at least one of a touch operation, a voice operation, and a gesture operation.

Figure 3:
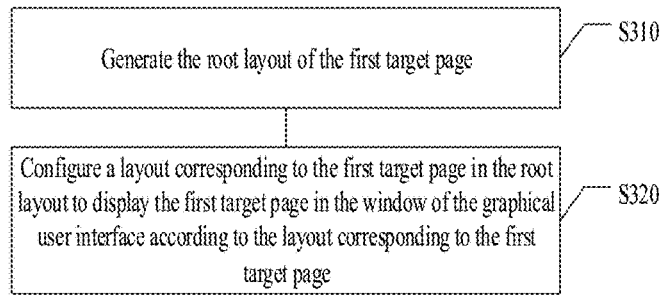
FIG. 3 is a schematic flowchart of a method for generating a first target page in some embodiments of the present disclosure.

For example, the child window displayed independently of the window where the first target page is located may be a floating window. Taking the Android operating system as an example, the floating window may include the system window in the Android operating system, and the system window may refer to a window that does not need to correspond to any Activity, and does not need to have the parent window. Specifically, the system window may include a window created by a system process. That is, the first triggering operation may include an operation of: switching a page, in any application window in the Android operating system or in the child window that has to be dependent on the parent window, to be displayed in the created system window of the Android operating system, such as a floating window. Exemplarily, before responding to the first triggering operation for the first target page in the window of the graphical user interface, the first target page may be generated first. Exemplarily, FIG. 3 is a schematic flowchart of a method for generating the first target page in some embodiments of the present disclosure. Referring to FIG. 3, the method includes step S310 to step S320.

In step S310, the root layout of the first target page is generated.

In some embodiments, a layout corresponding to the first target page includes only one root layout, in other words, a root element in the layout corresponding to the first target page has only one ViewGroup container. In the Android operating system, the view is an object drawn in the graphical user interface that the user can interact with, and ViewGroup is a layout container used to store other views and/or other ViewGroup objects.

Exemplarily, taking the Android operating system as an example, step S310 may be specifically implemented by: pre-defining a layout file in a XML (an extensible markup language) format, and in the layout file in the XML, format, configuring a certain view in the Activity or a layout container (ViewGroup) object as the root element, so as to generate the root layout corresponding to the first target page in advance.

After the root layout of the first target page is generated, in step S320, a layout corresponding to the first target page is configured in the root layout, to display the first target page in the window of the graphical user interface according to the layout corresponding to the first target page.

In some embodiments, the layout of the first target page includes a layout mode, a layout size, a layout position, and layout controls of the first target page, and a control of the first target page to be displayed in the window of the graphical user interface and its attribute.

Exemplarily, a specific implementation of step S320 may be to configure, in a custom manner, another layout object or another control in the layout file in the XML format to generate the layout corresponding to the first target page.

After the layout corresponding to the first target page is generated, the first target page may be displayed in the window of the graphical user interface according to the layout corresponding to the first target page.

Specifically, a unique root layout (a root view, that is, a root container) identity can be configured for a custom layout, for example, a root layout of the custom layout is named as rootView. According to the root layout identity, the layout file in the XML format of the first target page is instantiated as a View class object through a LayoutInflater.from(this).inflate( ) method. In other words, the layout file in the XML format of the first target page is loaded, and the layout file of the first target page is added to a preset position in the graphical user interface, so that the first target page is displayed in the window of the graphical user interface.

Further, the first parent layout is specified for the custom layout of the first target page through the LayoutInflaterfrom(this).inflate( ) method, so as to add the custom layout of the first target page to the specified first parent layout. The first parent layout specified for the custom layout corresponding to the first target page can be a layout corresponding to the page in any application window or in a certain child window that has to be dependent on the parent window. For example, any ViewGroup or View in the Android operating system is specified as the first parent layout of the layout corresponding to the first target page, which can be determined according to the requirements.

It should be noted that the foregoing steps S310 to S320 are described by taking writing the layout in XML as an example, to illustrate how to generate the layout corresponding to the first target page and display the first target page. In other embodiments, the layout corresponding to the first target page can also be written through Java codes. Specifically, in the Android operating system, all layout and control objects can be created through new keywords, and the created View control corresponding to the first target page is added to the ViewGroup layout, thereby realizing the display of the View control in the layout, and in turn, displaying the first page in the window of the corresponding graphical user interface, which is not particularly limited in this exemplary embodiment.

Through the above steps S310 to S320, the layout file can be customized and generated in advance, and the first target page is displayed in the window of the graphical user interface according to the custom generated layout file, thereby improving the flexibility and accuracy of the interface display.

It should be noted that it is also possible to directly use a page in a certain existing window in the application as the first target page without customizing the layout file. In addition, when the layout file corresponding to the first target page is customized, editing or modification can be performed in the basis of the layout file corresponding to a certain existing page in the application to generate the layout file corresponding to the first target page, which is not specifically limited by this exemplary embodiment.

After the first target page is displayed in the window of the graphical user interface according to the layout file of the first target page, a specific implementation of step S210 may be: in response to the first triggering operation for the first target page in the window of the graphical user interface, the first parent layout of the first target page is acquired according to the layout file of the first target page, and the first parent layout may include the first parent layout specified in the above-mentioned step S320 for the layout corresponding to the first target page.

Description is made by taking the layout file of the first target page named as rootView, and the window of the graphical user interface being the application window in the Android operating system as an example, in step S210, in response to the first triggering operation for the first target page in the window of the graphical user interface, a parent layout of rootView in the layout of the Activity is acquired. Specifically, the parent layout of the first target page can be acquired through a computer instruction "parentView=rootView.getParent( )", that is, the first parent layout is acquired.

After the first parent layout of the first target page is acquired, in step S220, the root layout of the first target page is removed from the first parent layout.

Exemplarily, the root layout of the first target page can be removed from the first parent layout through a computer instruction "remove".

Specifically, continuing taking the layout file of the first target page named as "rootView" as an example, the root layout of the first target page can be removed from the acquired first parent layout through computer instruction "parentView.removeView(rootView)".

It should be noted that, since the layout of the first target page is configured in the root layout, the layout corresponding to the first target page is invalid after the root layout of the first target page is removed from the first parent layout, that is, the first target page is not displayed in the window of the graphical user interface. Specifically, a state of the Activity corresponding to the window of the graphical user interface may be configured as a stopped state and switched to the background.

Continuing referring to FIG. 2, after the root layout of the first target page is removed from the first parent layout, in step S230, the child window displayed independently of the window where the first target page is located is created.

In some embodiments, the child window displayed independently of the window where the first target page is located may include the floating window. Specifically, taking the Android operating system as an example, a system window can be created and used as the child window displayed independently of the window where the first target page is located. Since the system window has the highest priority, the child window displayed independently of the window where the first target page is located may be displayed in the top level of the graphical user interface. That is, the created child window may always be displayed on an upper layer of other applications, and may not be obscured by windows in other applications.

Figure 4:
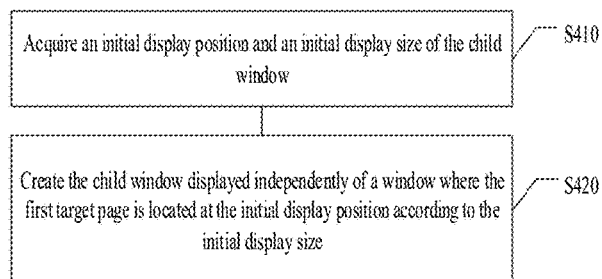
FIG. 4 is a schematic flowchart of a method for creating a child window displayed independently of a window where a first target page is located in some embodiments of the present disclosure.

Further, FIG. 4 is a schematic flowchart of a method for creating a child window displayed independently of a window where a first target page is located in some embodiments of the present disclosure. Referring to FIG. 4, the method includes step S410 to step S420.

In step S410, an initial display position and an initial display size of the child window are acquired; in step S420, the child window displayed independently of the window where the first target page is located is created at the initial display position according to the initial size.

For example, the initial display position and the initial display size of the created child window independently displayed in the graphical user interface can be configured in advance. The initial display position may be coordinates of a center point of the independently displayed child window, and the display size may include a width and a height of the independently displayed child window. Specifically, the initial display position and the initial display size of the independently displayed child window can be configured in a custom manner according to a situation. The initial display size of the independent child window may be larger than that of the window where the first target page is located, may also be smaller than that of the window where the first target page is located, or may be equal to that of the window where the first target page is located.

After the initial display position and the initial display size of the child window in the graphical user interface are configured in advance, upon creating the child window, the pre-configured initial display position and initial display size can be acquired, to create, at the initial display position according to the initial display size, the child window displayed independently of the window where the first target page is located.

After the child window displayed independently of the window where the first target page is located is created, continuing referring to FIG. 2, in step S240, the root layout of the first target page is added to the child window, to switch the first target page to be displayed in the child window.

Figure 5:
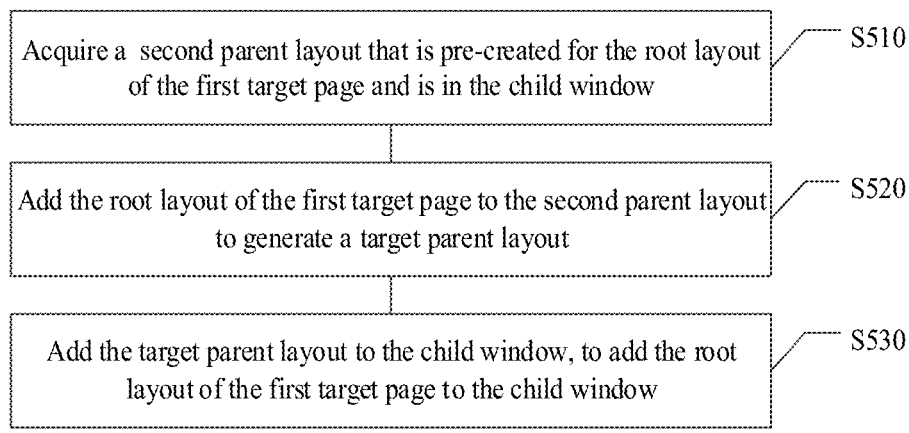
FIG. 5 is a schematic flowchart of a method for adding a root layout of a first target page to a child window in some embodiments of the present disclosure.

Exemplarily, FIG. 5 is a schematic flowchart of a method for adding a root layout of a first target page to a child window in some embodiments of the present disclosure. Referring to FIG. 5, the method may include step S510 to step S530. Specifically, in step S510, a second parent layout that is pre-created for the root layout of the first target page and is in the child page is acquired.

A layout, which is configured as the parent layout of the root layout of the first target page in the child window, may be pre-created before acquiring the second parent layout that is pre-created for the root layout of the first target page and is in the child window.

Specifically, in the Android operating system, a layout of the XML format can be first customized, and the custom layout in the XML format is instantiated as the View class to generate an instantiated object. The instantiated object is defined as a global variable, and then the global variable is configured as the parent layout of the root layout of the first target page in the child window, thereby pre-creating the second parent layout of the root layout of the first target page in the child window.

For example, the instantiated object floatParentView can be generated according to the custom layout in the XML format, floatParentView is declared as the global variable, and is determined as the second parent layout of the root layout (that is, the above-mentioned rootView) of the first target page in the child window.

Exemplarily, a specific implementation of the above step S510 may be to acquire a global variable corresponding to the instantiated object of the second parent layout that is pre-created for the root layout of the first target page and is in the child window, for example, to acquire the above global variable floatParentView.

After acquiring the second parent layout that is pre-created for the root layout of the first target page and is in the child window, in step S520, the root layout of the first target page is added to the second parent layout to generate the target parent layout. The target parent layout is essentially the second parent layout incorporated with the root layout of the first target page.

When the root layout of the first target page is added to the second parent layout, a display size of the first target page in the child window can further be determined according to pre-configured display parameters, and the first target page is switched to be displayed in the child window according to the determined display size. The display size includes a width and a height of the first target page displayed in the child window after switching, and the display size of the first target page in the child window is less than or equal to the display size of the child window in the graphical user interface.

For example, the root layout of the first target page can be added, through a computer program instruction "floatParentView.addView(rootView, new FrameLayout.LayoutParams (−1, −1))", to the second parent layout acquired in the following step S610, and the display size of the first target page in the child window is determined as the display size of the child window in the graphical user interface according to the pre-configured parameter LayoutParams (−1, −1), that is, the first target page is displayed throughout the child window.

After the target parent layout is generated by adding the root layout of the first target page to the second parent layout, in step S530, a target parent layout is added to the child window to add the root layout of the first target page to the child window.

For example, the target parent layout can be added to the child window through a WindowManager.addView( ) method in the Android operating system. Upon the addition, the child window can also be associated with a pre-configured child window size control parameter, thereby updating a value of the child window size control parameter and a value of the position control parameter according to the triggering operation from the client, and in turn, adjusting the display size of the child window in the graphical user interface according to the triggering operation from the client.

For example, the target parent layout is added to the child window through the computer program instruction "WindowManager.addView(floatParentView, LayoutParams)", and the child window is associated with the pre-configured child window size control parameter LayoutParams.

It should be noted that, since the layout of the first target page is configured in the root layout container of the first target page, adding the root layout of the first target page to the child window is essentially adding the layout corresponding to the first target page to the child window. Similarly, in step S220 described above, removing the root layout of the first target page from the first parent layout is essentially removing the layout corresponding to the first target page.

Through the above steps S510 to S530, the root layout of the first target page can be added to the created child window displayed independently of the window where the first target page is located, so that the first target page is switched to be displayed in the child window.

Exemplarily, as described in the above step S520, the first target page may be switched to be displayed in the child window according to the pre-configured display size of the first target page in the child window.

For example, in the above step S520, the display size of the first target page in the child window is pre-configured as the display size of the child window in the graphical user interface, so that the first target page after switching is displayed throughout the child window. In addition, it can also be customized according to display requirements, which is not specifically limited by this exemplary embodiment.

In another exemplary embodiment, adding the root layout of the first target page to the child window displayed independently of the window where the first target page is located may include: acquiring a second parent layout that is pre-created for the root layout of the first target page and is in the child page; adding the second parent layout to the child window; and adding the root layout of the first target page to the second parent layout For example, when the root layout of the first target page is added to the child window displayed independently of the window where the first target page is located, as shown in FIG. 5, the second parent layout that is pre-created for the root layout of the first target page and is in the child window can be acquired, and the root layout of the first target page is first added to the acquired second parent layout, and then the parent layout added with the root layout of the first target page is added to the child window. Alternatively, the second parent layout that is pre-created for the root layout of the first target page and is in the child window is acquired, and the second parent layout is added to the child window first. At this time, the second parent layout is already the parent layout where the child window is located, and then the root layout of the first target page is added to the second parent layout that has been added to the child window, so that the first target page is switched to be displayed in the child window, which is not specifically limited by this exemplary embodiment.

Exemplarily, after the first target page is switched to be displayed in the child window, a display position and/or a display size of the child window in the graphical user interface may be adjusted in response to an position movement operation and/or a size adjustment operation for the child window.

For example, the position movement operation may include an operation of controlling the position movement of the child window in the graphical user interface, which may be a touch operation, for example, clicking any position in the graphical user interface to move a child page from an initial position to a position corresponding to the click operation, or may be a voice control operation, a gesture control operation, etc.

Taking the gesture control operation as an example, a movement direction and a movement distance of the gesture control operation can be monitored, a coordinate position of a center point of the child window in the graphical user interface is updated in real time, so as to realize the real-time adjustment of the display position of the child window in the graphical user interface according to the gesture control operation.

A size adjustment operation may include at least one of the touch operation, the voice control operation, and the gesture control operation.

Exemplarily, the interface display method provided by the embodiment shown in FIG. 2 further includes: recording the adjusted display position and/or the adjusted display size of the child window in the graphical user interface; and updating the initial display position and/or the initial display size of the child window according to the adjusted display position and/or the adjusted display size.

For example, system variables A and B can be declared separately, where variable A is used to record the adjusted display position corresponding to each position movement operation, and variable B is used to record the adjusted display size corresponding to each size adjustment operation. Variable A and variable B are assigned to variables corresponding to the initial display position and initial display size, respectively, to update the values of the initial display position and initial display size. In this way, when responding to the first triggering operation for the first target page in the window of the graphical user interface again, the child window displayed independently of the window where the first target page is located can be directly created according to the updated initial display position and/or the updated initial display size to further enhance the flexibility of interface display.

Exemplarily, switching the first target page to be displayed in the child window includes: acquiring a first display state in the child window that is pre-configured for each control in a layout of the first target page; and switching the first target page to be displayed in the child window according to the first display state of each control in the child window. The first display state of each control in the layout of the first target page in the child window can be pre-configured in a custom manner according to requirements. Specifically, the first display state may include: whether each control in the layout of the first target page is displayed in the child window and/or a display position of each control of the first target page in the child window.

For example, there are five controls in the layout of the first target page, and first display states of these five controls in the child window can be configured as being displayed, then after the first target page is switched to be displayed in the child window, all these five controls can be displayed in the child window. Alternatively, the first display state of one or several of the five controls in the child window can be configured as being hidden, and a control configured as a hidden state is not displayed in the child window. In addition, the display position of the control in the layout of the first target page in the child window can also be configured in advance. Specifically, for a control in the first target page whose display position needs to be changed, its display position in the child window can be reconfigured. A case, where the first target page is a video playback page and a video playback control in the layout of the first target page is at the lower left of the window, is described as an example, the display position of the video playback control in the child window can be pre-configured to be the lower right, and display positions of other controls in the child window are the same as the display positions in the window where the first target page is located.

By configuring the first display state of each control in the layout of the first target page in the child window in the custom manner, the flexibility of the interface display can be improved. In addition, a case, where the window of the graphical user interface is the application window in the Android operating system, and the created child window displayed independently of the window the graphical user interface is the floating window in the Android operating system, is described as an example, when the first display state of each control of the first target page in the child window is consistent with the display state of each control in the window of the graphical user interface, interactive operations with the same complexity as in the application window can also be implemented in the floating window.

Further, after the first target page is switched to be displayed in the child window, the method further includes: in response to a second triggering operation for a preset control in the child window, acquiring a second display state associated with the preset control, where the second display state is pre-configured for each control in a layout of the first target page in the child window; and updating a page displayed in the child window according to the second display state of each control in the child window. The updating the page displayed in the child window according to the second display state of each control in the child window includes: updating a layout corresponding to the page displayed in the child window according to the second display state of each control in the child window. Taking the page in the child window as a display page of picture "A" as an example, when the page displayed in the child window is updated according to the second display state of each control in the child window, only the display state of the corresponding control in the page layout is updated, and picture "A" is still displayed in the window.

Exemplarily, a preset control may be pre-configured in the child window, and the preset control is used to adjust the display state of each control of the first target page in the child window. Specifically, the pre-configured second display state of each control in the layout of the first target page in the child window can be associated with the preset control. For example, there are ten controls in the layout of the first target page, the display states of control 1, control 8, and control 9 in the layout of the first target page in the child window can be configured as be displayed, and the display states of the remaining controls can be configured as being hidden, and then the configuration information and the preset control are associated in advance. In this way, when the preset control is triggered in the child window, the page displayed in the child window can be updated according to the configuration information associated with the preset control. That is, when the preset control is triggered in the child window, the controls displayed in the page in the child window only include three controls: control 1, control 8, and control 9. The user can only perform interactive operations corresponding to these three controls.

For example, in response to the first triggering operation, the first target page is switched to be displayed in the child window. At this time, control 1, control 2, control 3, control 5, control 7, control 8, control 9, and control 10 are all displayed in the window, and then in response to the second triggering operation on the preset control in the child window, the display state associated with the preset control in the child window can be acquired, where the display state is pre-configured for each control in the layout of the first target page. Therefore, only control 1, control 2, and control 9 are displayed in the page in the child window, and the remaining controls are not displayed in the page of the child window. The pre-configured display state of each control in the layout of the first target page associated with the preset control in the child window is: control 1, control 8, and control 9 are in the display state, and the remaining controls are in the hidden state.

For example, the layout of the first target page can be taken as an original layout, which can achieve the most complicated interaction; and after the first target page is switched to be displayed in the child window, the layout of the page in the child window can be a standard mode of the original layout, that is, some basic and conventional interactions can be achieved, which is simpler than the interaction achieved by the original layout; and a layout corresponding to the configuration information of the preset controls in the child window can be a streamlined mode of the original layout, that is, which can realize simpler interactions than the standard mode of the original layout.

Exemplarily, in the above step S230, the creating the child window displayed independently of the window where the first target page is located includes: creating multiple child windows displayed independently of the window where the first target page is located; correspondingly, in step S240, the adding the root layout of the first target page to the child windows includes: adding the root layout of the first target page to each child window.

Specifically, multiple threads can be started to simultaneously create multiple child windows displayed independently of the window where the first target page is located. For each child window, the creation method has been described in detail in step S230 above, and won't be repeated here. Similarly, for each child window, the method for adding the root layout of the first target page to the child window has been described in detail in step S240 above, and will not be repeated here.

It should be noted that when the multiple child windows displayed independently of the window where the first target page is located are created, display areas determined by initial display positions and initial display sizes of individual child windows can overlap or not. In individual child windows, first display states of each control in the layout of the first target page may be completely the same, may also be partially the same, or may be different from one another, which is not particularly limited by this exemplary embodiment.

Exemplarily, after the root layout of the first target page is added to the child windows to switch the first view to be displayed in each child window, the interface display method provided by the embodiment shown in FIG. 2 further includes: in response to an editing operation for any of the child windows, determining display information corresponding to the editing operation; and synchronously displaying the display information corresponding to the editing operation in other child pages. The editing operation may include a triggering operation on the control in the child window or a real-time editing operation for page display content in the child window. The page display content in the child window includes the video, the image, the text, the table, etc.

Taking the first target page as a certain page in the drawing software in the window of the graphical user interface as an example, after the first target page is switched to be displayed in multiple child windows, for example, the first target page is switched to be displayed in child window 1, child window 2 and child window 3, when the user performs the editing operation in the child window 1, for example, drawing a flower, the child window 2 and the child window 3 may synchronously display the flower in the child window 1 in real time. Specifically, child window 2 and child window 3 can synchronously display the display information of child window 1 during the drawing in real time. For example, if a branch of the flower is first drawn in child window 1, then child window 2 and child window 3 can synchronously display the branch in real time.

After the first target page is switched to be displayed in the child window, the first target page may be switched to be displayed in the original window of the graphical user interface from the child window again.

Figure 6:
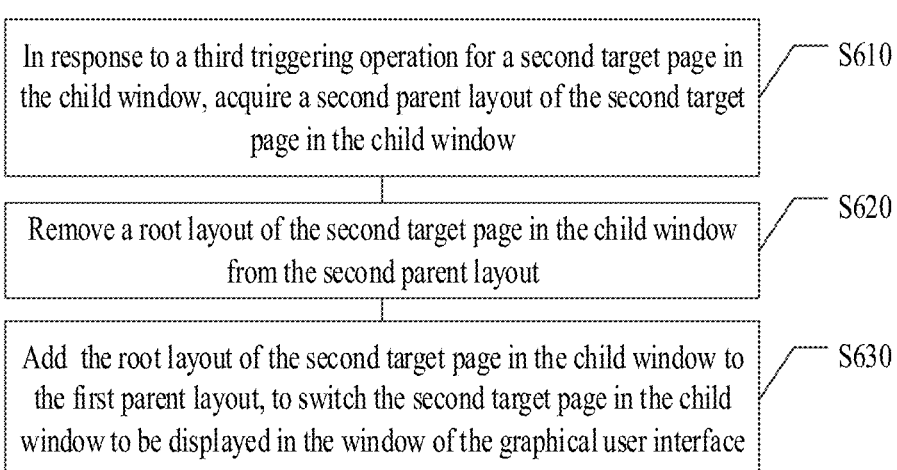
FIG. 6 is a flowchart of a method for switching a page in a child window to be displayed on a window where a first page is located in some embodiments of the present disclosure.

Exemplarily, FIG. 6 is a flowchart of a method for switching a page in a child window to be displayed in a window where a first target page is located in some embodiments of the present disclosure. Referring to FIG. 6, the method includes steps S610 to S630.

In step S610, in response to a third triggering operation for a second target page in the child window, the second parent layout of the second target page in the child window is acquired.

The display content of the second target page is the same as that of the first target page. Whether the controls displayed in the second target page and the first target page are the same and whether the positions of the displayed controls in the second target page and the first target page are the same can be determined according to the aforementioned first display state and the second display state. In other words, the first target page and the second target page are essentially pages that have the same display content and in which only the displayed controls and the display positions of individual controls may be different. In addition, the displayed controls in the first target page and the second target page may also be completely the same. For example, when the first display state and the second display state are exactly the same as the display state of each control of the first target page in the window of the graphical user interface, the displayed controls in the first target page and the second target page are exactly the same.

Description is made by taking the Android operating system as an example. For video A, when video A is displayed in the application window or the child window that depends on a certain parent window, it corresponds to the first target page; when video A is displayed in the created system window (i.e., the floating window), it corresponds to the second target page.

In some embodiments, the third triggering operation is an operation of controlling the second target page in the child window to be switched to be displayed in the window where the first target page is located. Specifically, the operation of controlling the second target page in the child window to be switched to be displayed in the window where the first target page is located includes at least one of a touch operation, a voice operation, and a gesture operation.

It should be noted that, in response to an operation of closing the created independent child window, the window of the graphical user interface where the first target page is located and the created independent child window can be closed, that is, both are destroyed, or the second target page in the created child window is switched to be displayed in the window where the first target page was originally located, which is not specifically limited by this exemplary embodiment. After the second target page in the created child window is switched to be displayed in the window of the graphical user interface, the created child window can be destroyed.

Exemplarily, a specific implementation of step S610 may be that: in response to the third triggering operation for the second target page in the child window, the second parent layout that is pre-created for the root layout of the second target page and is in the child window is acquired. The second parent layout may include the second parent layout created in the above step S510.

For example, the second parent layout that is pre-created for the root layout of the second target page and is in the child window is acquired through a computer program instruction "floatParentView=rootView.getParent( )".

In step S620, a root layout of the second target page in the child window is removed from the second parent layout.

For example, the root layout of the second target page in the child window is removed from the second parent layout through a computer program instruction "floatParentView.removeView(rootView)".

In step S630, the root layout of the second target page in the child window is added to the first parent layout of the first target page, so as to switch the second target page in the child window to be displayed in the window of the graphical user interface.

For example, the root layout of the second target page in the child window can be added to the first parent layout corresponding to the first target page through a computer program instruction "parentView.addView(rootView, new FrameLayout.LayoutParams(−1, −1))", and a pre-configured display size parameter of the first target page in the window of the graphical user interface where it was originally located is also acquired. For example, "new Frame- Layout.LayoutParams(-1, -1)" means that the first target page is displayed throughout the window of the graphical user interface, so that the content displayed in the child window is switched to be displayed in the window of the graphical user interface, that is, the first target page is displayed in the window of the graphical user interface again.

Exemplarily, the switching the second target page in the child window to be displayed in the window of the graphical user interface includes: acquiring a third display state of each control in the layout corresponding to the first target page in the window of the first target page; and switching the second target page in the child window to be displayed in the window of the graphical user interface according to the third display state of each control in the window of the first page. Specifically, the display state of each control in the layout of the first target page in the window of the graphical user interface is acquired, and the first target page is displayed in the window of the graphical user interface again.

It should be noted that the third display state of each control in the layout of the first target page in the window of the first target page includes a fixed display parameter and a dynamic display parameter, the fixed display parameter indicates whether the control is displayed in the page of the first target view, for example, 1 means being displayed, 0 means being hidden (that is, not displaying), and the dynamic display parameter includes a real-time change parameter of the control, such as a current playback progress of a playback button etc. The dynamic display parameter changes dynamically with time or event triggers, and is acquired and synchronized in real time during the switching and displaying. Similarly, the second display state of each control in the layout corresponding to the first target page in the child window also includes the above-mentioned fixed display parameter and dynamic display parameter, which will not be repeated here.

In this exemplary embodiment, when the switching and the displaying are performed, through removing the page before switching from the parent layout of the page before switching and adding the layout of the page before switching to the parent layout of the page after switching, the process of layout destruction and reconstruction during the switching and displaying can be avoided, thereby increasing the speed of the switching and displaying, and also reducing the occupation of computer memory resources during the switching and displaying. Further, by pre-configuring the display states of each control in the layout corresponding to the page to be switched in different windows, the flexibility of the switching and displaying can be realized.

Figure 7:
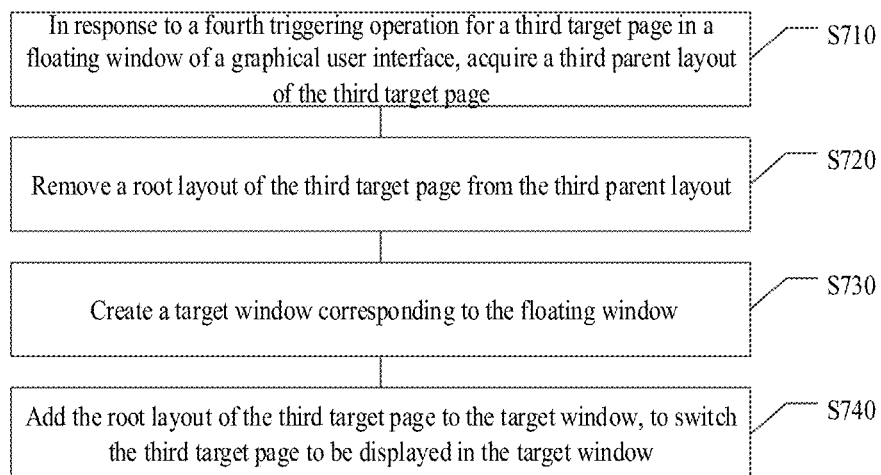
FIG. 7 shows another interface display method in some embodiments of the present disclosure.

Further, FIG. 7 shows another interface display method in some embodiments of the present disclosure. Referring to FIG. 7, the method includes step S710 to step S740.

In step S710, in response to a fourth triggering operation for a third target page in a floating window of a graphical user interface, a third parent layout of the third target page is acquired. Taking the Android operating system as an example, the floating window in the graphical user interface may include the system window in the Android operating system. The system window has been described in the foregoing embodiments, and will not be repeated here.

In some embodiments, the fourth triggering operation is an operation of controlling the third target page to be switched to be displayed in the target window. Specifically, the operation of controlling the third target page to be switched to be displayed in the target window includes at least one of the touch operation, the voice operation, and the gesture operation. Taking the Android operating system as an example, the target window may include the application window or the child window that depends on a certain parent window in the Android operating system. The third target page can be displayed in the floating window in the following ways: generating a root layout of the third target page in advance; configuring the layout of the third target page in the root layout of the third target page; and adding a layout of the third target page to a pre-created third parent layout of the page in the floating window, so that the third target page is displayed in the floating window.

Exemplarily, a specific implementation of step S710 may be that: in response to the fourth triggering operation for the third target page in the floating window of the graphical user interface, the third parent layout that is pre-created for the root layout of the third target page and is in the floating window is acquired.

Taking the root layout (root View, that is, the root container) of the third target page named as rootView as an example, the third parent layout of the third target page can be acquired through a computer program instruction "floatParentView=rootView.getParent( )". floatParentView is the acquired third parent layout of the third target page.

After the pre-created third parent layout of the third target page in the floating window is acquired, in step S720, the root layout of the third target page is removed from the third parent layout.

For example, the root layout rootView of the third target page is removed from the acquired third parent layout floatParentView through a computer program instruction "floatParentView.removeView(rootView)".

Next, in step S730, a target window corresponding to the floating window is created.

In some embodiments, as described above, taking the Android operating system as an example, the target window corresponding to the floating window may include the application window or the child window that depends on a certain parent window in the Android operating system, and the application window or the child window that depends on a certain parent window in the Android operating system have been described in the foregoing embodiments, and details are not described here again. Exemplarily, a specific implementation of step S730 may be to create the target window corresponding to the floating window in the Activity of the Android operating system.

After the target window corresponding to the floating window is created, in step S740, the root layout of the third target page is added to the target window to switch the third target page and display it in the target window.

Exemplarily, the adding the root layout of the third target page to the target window to switch the third target page and display it in the target window includes: adding the root layout of the third target page to a parent layout of the target window to switch the third target page to be displayed in the target window.

Specifically, in the Android operating system, the root layout of the third target page can be added to the parent layout of the target window through a computer program instruction "parentView.addView(rootView, new FrameLayout.LayoutParams(-1, -1))".

rootView is an identity of the root container of the third target page (namely, the name of the root container and also the name of the root layout). rootView includes the layout of the third target page created based in the root layout of the third target page. Specifically, the layout content of the third target page can be customized according to requirements.

new FrameLayout.LayoutParams(-1, -1) means that the third target page is displayed throughout the target window after being switched to the target window. That is, the display size of the third target page in the target window is the same as the size of the target window. In addition, the display size of the third target page in the target window can also be customized according to requirements to be smaller than the size of the target window.

parentView is the parent layout of the target window, which can be customized. Customization may include designating a customized layout as the parent layout of the page in the target window, and may also include customizing and designating an existing layout in the Android operating system as the parent layout of the page of the target window according to requirements, which is not specifically limited by this exemplary embodiment.

Figure 8:
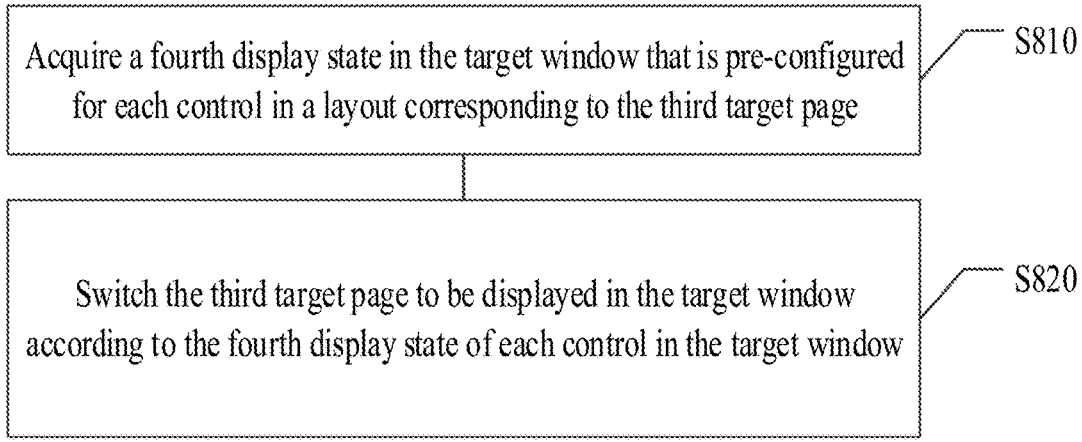
FIG. 8 is a schematic flowchart of a method for switching a third target page to be displayed on a target window in some embodiments of the present disclosure.

Next, by way of example, FIG. 8 is a schematic flowchart of a method for switching a third target page to be displayed in a target window in some embodiments of the present disclosure. Referring to FIG. 8, the method may include step S810 to step S820.

In step S810, a pre-configured fourth display state, in the target window, of each control in a layout corresponding to the third target page is acquired.

In some embodiments, the fourth display state includes whether each control in the layout corresponding to the third page is displayed in the target window and a display position thereof in the target window.

In step S820, the third target page is switched to be displayed in the target window according to the fourth display state of each control in the target window.

For example, the fourth display state, in the target window, of each control in the layout corresponding to the third target page can be pre-configured. For example, there are eight controls in the layout corresponding to the third target page, and fourth display states of five controls in these controls in the target window can be configured as being displayed, and the remaining controls' fourth display states in the target window can be configured as being hidden. After the third target is switched to be displayed in the target page, only five controls are displayed in the target page. It should be noted that when the third target page is switched to be displayed in the target window, the floating window is switched to the system background.

Figure 9:
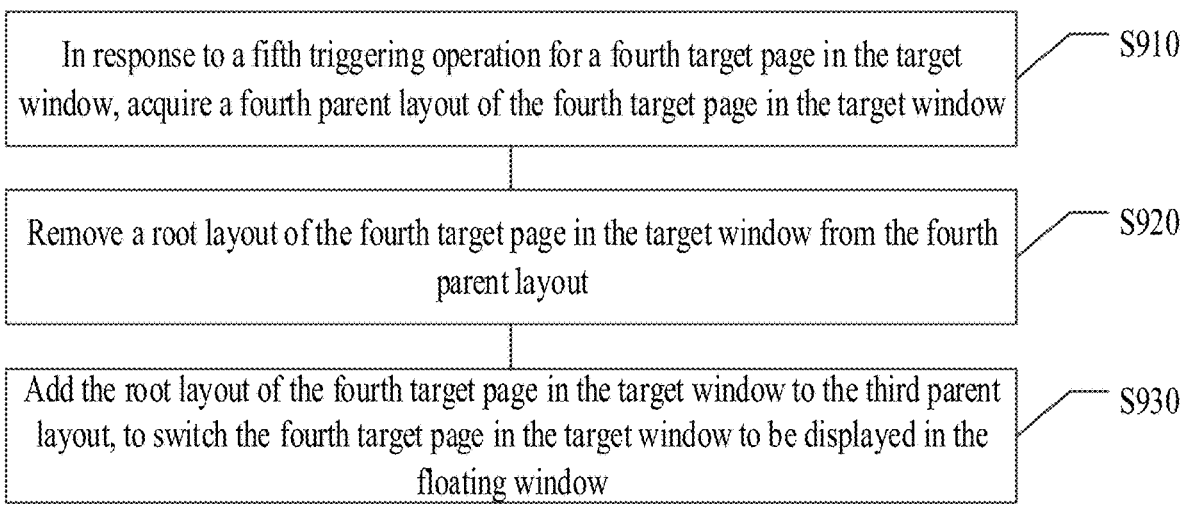
FIG. 9 is a schematic flowchart of a method for switching a page in a target window to be displayed on a floating window again in some embodiments of the present disclosure.

After the third target page is switched to be displayed in the target window, the pages in the target window can also be switched to be displayed in the floating window again. Exemplarily, FIG. 9 is a schematic flowchart of a method for switching a page in a target window to be displayed in a floating window again in some embodiments of the present disclosure. Referring to FIG. 9, the method includes step S910 to step S930.

In step S910, in response to a fifth triggering operation for a fourth target page in the target window, a fourth parent layout of the fourth target page in the target window is acquired.

In some embodiments, the fifth triggering operation is an operation of controlling the fourth target page in the target window to be switched to be displayed in the floating window in FIG. 8, which includes at least one of the touch operation, the voice operation, and the gesture operation.

Exemplarily, step S910 may be specifically implemented as follows: in response to the fifth triggering operation for the fourth target page in the target window, a pre-customized fourth parent layout of the fourth target page in the target window is acquired, that is, parentView in the above step S740.

It should be noted that the fifth triggering operation may also include a triggering operation to close the target window, that is, in response to a closing operation for the page in the target window, the page in the target window is switched to be displayed in the floating window in FIG. 8.

Next, in step S920, a root layout of the fourth target page in the target window is removed from the fourth parent layout.

Specifically, the root layout of the fourth target page in the target window can be removed from the fourth parent layout through a computer program instruction "parentView.removeView(rootView)".

In step S930, the root layout of the fourth target page in the target page window is added to the third parent layout, so as to switch the fourth target page in the target window to be displayed in a child floating window.

Taking the Android operating system as an example, the fourth target page in the target window can be switched to be displayed in the floating window through a computer program instruction "floatParentView.addView(rootView, new FrameLayout.LayoutParams(−1, −1))". In addition, the display size of the page in the floating window is configured to be the same as the size of the floating window, that is, the page in the floating window is displayed throughout the floating window. In addition, the display size of the page in the floating window can also be configured to be smaller than the size of the floating window, which is not particularly limited by this exemplary embodiment.

Exemplarily, the switching the fourth target page in the target window to be displayed in the floating window includes: acquiring a fifth display state of each control, in the layout corresponding to the third target page, in the floating window; and switching the fourth target page to be displayed in the floating window according to the fifth display state of each control in the floating window.

The display content of the fourth target page is the same as that of the third target page. Whether the controls displayed in the fourth target page and the third target page are the same and whether the positions of the displayed controls are the same can be determined according to the aforementioned fourth display state and the fifth display state. In other words, the fourth target page and the fifth target page are essentially pages that have the same display content and in which only the displayed controls and the display positions of individual controls may be different. In addition, the displayed controls in the fourth target page and the third target page may also be completely the same. For example, when the fourth display state and the fifth display state are exactly the same, the displayed controls in the fourth target page and the fifth target page are exactly the same.

Taking the Android operating system as an example, for video B, when video B is displayed in the application window or the child window that depends on a certain parent window, it corresponds to the fourth target page; when video B is displayed in the floating window, it corresponds to the third target page. For example, after the third target page in the floating window is switched to be displayed in the target window, the page in the target window can be switched to be displayed in the floating window again through steps S910 to S930 described above. During the switching and displaying, the fifth display state of each control, in the layout corresponding to the third target page, in the floating window is re-acquired. Taking there being eight controls in the layout corresponding to the third target page as an example, fifth display states of these eight controls are to be displayed in the floating window, after switching again, these eight controls can be displayed in the floating window, and parameter information of these eight controls upon switching can be acquired. For example, a playback progress of the playback button upon switching is acquired, so as to achieve continuous uninterrupted playback during the switching.

It should be noted that the display size of the target window in the graphical user interface in the interface display method provided by the embodiment shown in FIG. 8 may be larger than the display size of the floating window in the graphical user interface. For example, the display size of the floating window in the graphical user interface is smaller than the size of the graphical user interface, the size of the target window is the same as the size of the graphical user interface, that is, the view in the floating window is switched to be displayed in the target page and displayed in a full screen manner in the graphical user interface; the initial display size of the target window in the graphical user interface may also be smaller than the display size of the floating window in the graphical user interface; the initial display size of the target window in the graphical user interface may also be equal to the display size of the floating window in the graphical user interface.

Those skilled in the art may understand that all or part of the steps for implementing the above-described embodiments are implemented as computer programs executed by a CPU. When the computer program is executed by the CPU, the above function defined by the above method provided by the present disclosure is executed. The program may be stored in a non-transitory computer-readable storage medium, and the non-transitory computer-readable storage medium may be a read-only memory, a magnetic disk, or an optical disk, for example.

In addition, it should be noted that the above-mentioned drawings are only schematic illustrations of processes included in the method according to the exemplary embodiment of the present disclosure, and are not intended to limit the purpose. It is understood that the processes shown in the above drawings do not indicate or limit the chronological order of these processes. In addition, for example, it is also understood that these processes may be performed synchronously or asynchronously in multiple modules.

Figure 10:
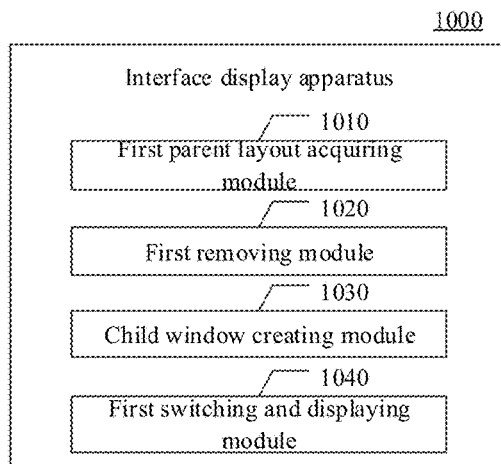
FIG. 10 is a schematic structural diagram of an interface display apparatus in some embodiments of the present disclosure.

FIG. 10 is a schematic structural diagram of an interface display apparatus in some embodiments of the present disclosure. Referring to FIG. 10, an interface display apparatus 1000 includes a first parent layout acquiring module 1010, a first removing module 1020, a child window creating module 1030, and a first switching and displaying module 1040.

The first parent layout acquiring module 1010 is configured to, responding to a first triggering operation for a first target page in a window of a graphical user interface, acquire a first parent layout of the first target page.

The first removing module 1020 is configured to remove a root layout of the first target page from the first parent layout. The child window creating module 1030 is configured to create a child window displayed independently of the window. The first switching and displaying module 1040 is configured to add the root layout of the first target page to the child window, so as to switch the first target page to be displayed in the child window.

In some embodiments of the present disclosure, based in the foregoing embodiment, the above-mentioned interface display apparatus 1000 further includes a child window switching module, and the child window switching module is configured to:

in response to a third triggering operation for a second target page in the child window, acquire the second parent layout of the second target page in the child window;

remove a root layout of the second target page in the child window from the second parent layout; and add the root layout of the second target page in the child window to the first parent layout, so as to switch the second target page in the child window to be displayed in the window of the graphical user interface.

Figure 11:
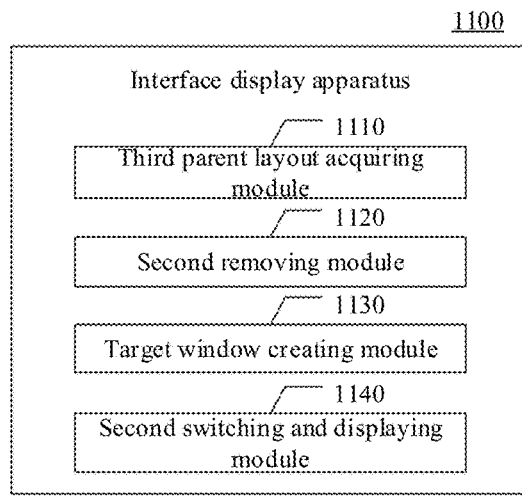
FIG. 11 shows a schematic structural diagram of another interface display apparatus in some embodiments of the present disclosure.

FIG. 11 is a schematic structural diagram of another interface display apparatus in some embodiments of the present disclosure. Referring to FIG. 11, an interface display apparatus 1100 includes: a third parent layout acquiring module 1110, a second removing module 1120, a target window creating module 1130, and a second switching and displaying module 1140.

The third parent layout acquiring module 1110 is configured to, in response to a fourth triggering operation for a third target page in a floating window of a graphical user interface, acquire a third parent layout of the third target page;

the second removing module 1120 is configured to remove a root layout of the third target page from the third parent layout;

the target window creating module 1130 is configured to create a target window corresponding to the floating window; and the second switching and displaying module 1140 is configured to add the root layout of the third target page to the target window, so as to switch the third target page to be displayed in the target window.

In some embodiments of the present disclosure, based in the foregoing embodiment, the interface display apparatus 1100 further includes a target window switching and displaying module, and the target window switching and displaying module is configured to:

in response to a fifth triggering operation for a fourth target page in the target window, acquire a fourth parent layout of the fourth target page in the target window;

remove a root layout of the fourth target page in the target window from the fourth parent layout; and add the root layout of the fourth target page in the target window to the third parent layout, so as to switch the fourth target page in the target window to be displayed in the floating window.

The specific details of each module in the above interface display apparatus have been described in detail in the corresponding interface display method, and therefore will not be repeated here.

It should be noted that although modules or units of devices for executing actions are described above, such division of modules or units is not mandatory. In fact, features and functions of two or more of the modules or units described above may be embodied in one module or unit in accordance with the embodiments of the present disclosure. Conversely, the features and functions of one module or unit described above may be further divided into multiple modules or units.

In addition, although the various steps of the method of the present disclosure are described in a particular order in the figures, this is not required or implied that the steps must be performed in the specific order, or all the steps shown must be performed to achieve the desired result. Additionally or alternatively, certain steps may be omitted, multiple steps may be combined into one step, and/or one step may be decomposed into multiple steps and so on.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB disk, a mobile hard disk, etc.) or on a network, including a number of instructions to make a computing device (which may be a personal computer, a server, a terminal apparatus, or a network device, etc.) to perform the methods according to embodiments in the present disclosure.

In some exemplary embodiments of the present disclosure, there is also provided a computer-readable storage medium than can implement the above method, and a program product capable of implementing the above-mentioned method of the present specification is stored in the computer-readable storage medium. In some possible embodiments, aspects of the present disclosure may also be implemented in the form of a program product, which includes program code. When the program product runs on a terminal device, the program code is used to make the terminal device perform the steps according to various exemplary embodiments of the present disclosure described in the above-mentioned "exemplary method" section of this specification.

Figure 12:
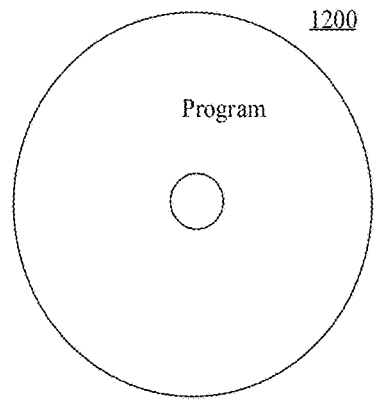
FIG. 12 shows a schematic structural diagram of a computer-readable storage medium in some embodiments of the present disclosure.

Referring to FIG. 12, a program product 1200 for implementing the above method according to an embodiment of the present disclosure is described. The program product 1200 can use a portable compact disc read-only memory (CD-ROM) and include the program code, which may run on a terminal device, for example, personal computer. However, the program product of the present disclosure is not limited thereto. In this document, the readable storage medium may be tangible medium containing or storing the program, and the program may be used by or in combination with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as a part of a carrier wave, which carries readable program code. Such a propagated data signal may take many forms, including but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, apparatus, or device.

The program code contained in the readable medium may be transmitted using any appropriate medium, including but not limited to wireless, wired, optical cable, RF, etc., or any suitable combination of the foregoing.

The program code for performing the operations of the present disclosure may be written in any combination of one or more programming languages, which include object-oriented programming languages, such as Java, C++, etc. and further include conventional procedural programming language, such as 'C' or a similar programming language. The program code may be executed entirely or partly in the user computing device, may be executed as an independent software package, may be executed partly in the user computing device and partly in the remote computing device, or may be executed entirely in the remote computing device or server. In the case of involving remote computing devices, the remote computing devices may be connected to the user computing device via any kind of network, such as a local area network (LAN) or a wide area network (WAN), or it may be connected to external computing devices, for example, connected to external computing devices via the Internet by use of an Internet service provider.

In some embodiments of the present disclosure, there is further provided an electronic device capable of implementing the above method.

Those skilled in the art may understand that various aspects of the present disclosure may be implemented as a system, method, or program product. Therefore, various aspects of the present disclosure may be embodied in the following forms: a complete hardware implementation, a complete software implementation (including firmware, microcode, etc.), or a combination of hardware and software, which may be collectively referred to herein 'circuit', 'module', or 'system'.

An electronic device 800 according to this embodiment of the present disclosure is described below with reference to FIG. 13. The electronic device 1300 shown in FIG. 13 is only an example, and should not bring any limitation to the functions and use scope of the embodiments of the present disclosure.

Figure 13:
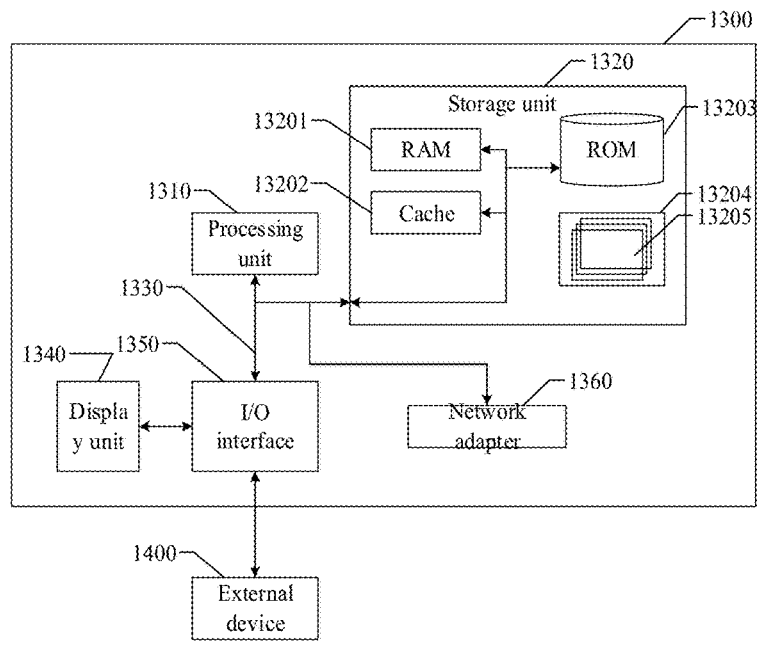
FIG. 13 shows a schematic structural diagram of an electronic device in some embodiments of the present disclosure.

As shown in FIG. 13, the electronic device 1300 is expressed in the form of a general-purpose computing device. The components of the electronic device 1300 may include, but are not limited to, at least one processing unit 1310, at least one storage unit 1320, a bus 1330 connecting different system components (including the storage unit 1320 and the processing unit 1310) and a display unit 1340.

In the example above, the storage unit stores program codes, and the program codes may be executed by the processing unit 1310, so that the processing unit 1310 executes various steps of the exemplary embodiments according to the present disclosure described in the above-mentioned 'exemplary method' in the specification. For example, the processing unit 1310 may execute the method shown in FIG. 2: in step S210, responding to a first triggering operation for the first target page in a window of the graphical user interface, a first parent layout of the first target page is acquired; in step S220, a root layout of the first target page is removed from the first parent layout; in step S230, a child window displayed independently of the window of the graphical user interface is created; and in step S240, the root layout of the first target page is added to the child window to switch the first target page to be displayed in the child window.

As another example, the processing unit 1310 may also perform various steps as shown in FIG. 3 to FIG. 9.

The storage unit 1320 may include a readable medium in the form of a volatile storage unit, such as a random access storage unit (RAM) 13201 and/or a cache storage unit 13202, and may further include a read-only storage unit (ROM) 13203.

The storage unit 1320 may further include a program/utility tool 13204 having a set of (at least one) program modules 8205. Such program modules 13205 include, but are not limited to, an operating system, one or more application programs, other program modules, and program data. Each or some combination of these examples may include an implementation of a network environment.

The bus 1330 may be one or more of several types representing bus structures, including a storage unit bus or a storage unit controller, a peripheral bus, a graphics acceleration port, a processing unit, or a local bus that uses any bus structure in a variety of bus structures.

The electronic device 1300 may also communicate with one or more external devices 1400 (such as a keyboard, pointing device, Bluetooth® device, etc.), may also communicate with one or more devices that enable a user to interact with the electronic device 1300, and/or with any device (e.g., router, modem, etc.) that enables the electronic device 1300 to communicate with one or more other computing devices. This communication may be performed through an input/output (I/O) interface 1350. Moreover, the electronic device 1300 may also communicate with one or more networks (such as a local area network (LAN), a wide area network (WAN), and/or a public network, such as the Internet) through the network adapter 1360. As shown, the network adapter 1360 communicates with other modules of the electronic device 1300 through the bus 1330. It should be understood that although not shown in the figure, other hardware and/or software modules may be used in conjunction with the electronic device 1300, including but not limited to: microcode, device drivers, redundant processing units, external disk drive arrays, RAID systems, tape drives, data backup storage systems and the like.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB disk, a mobile hard disk, etc.) or on a network, including a number of instructions to make a computing device (which may be a personal computer, a server, a terminal apparatus, or a network device, etc.) to perform the methods according to embodiments in the present disclosure.

In addition, it should be noted that the above-mentioned drawings are only schematic illustrations of processes included in the method according to the exemplary embodiment of the present disclosure, and are not intended to limit the purpose. It is understood that the processes shown in the above drawings do not indicate or limit the chronological order of these processes. In addition, for example, it is also understood that these processes may be performed synchronously or asynchronously in multiple modules.

Other embodiments of the present disclosure will be apparent to those skilled in the art after consideration of the specification and practice of the present disclosure disclosed here. The present application is intended to cover any variations, uses, or adaptations of the present disclosure, which are in accordance with the general principles of the disclosure and include common general knowledge or common technical means in the art that are not disclosed in the present disclosure. The specification and embodiments are deemed to be exemplary only and the true scope and spirit of this disclosure is indicated by the claims.

What is claimed is:

1. An interface display method, comprising:
  responding to a first triggering operation for a first target page in a window of a graphical user interface, and acquiring a first layout of the first target page;
  removing a root element of the first target page from the first layout, wherein the root element comprises a layout container for configuring the first layout;
  creating a child window displayed independently of the window; and
  switching the first target page to be displayed in the child window by adding the root element of the first target page to a second layout corresponding to the child window.

2. The interface display method according to claim 1, wherein, before responding to the first triggering operation for the first target page in the window of the graphical user interface, the method further comprises:
  generating the root element of the first target page; and
  configuring a layout corresponding to the first target page in the root element, so as to display the first target page in the window of the graphical user interface according to the layout corresponding to the first target page.

3. The interface display method according to claim 1, wherein the adding the root element of the first target page to the child window comprises:
  acquiring the second layout that is pre-created for the root element of the first target page and is in the child window;
  generating a target layout by adding the root element of the first target page to the second layout; and
  adding the root element of the first target page to the child window by adding the target layout to the child window.

4. The interface display method according to claim 1, wherein the adding the root element of the first target page to the child window comprises:
  acquiring a second layout that is pre-created for the root element of the first target page and is in the child page;
  adding the second layout to the child window; and
  adding the root element of the first target page to the second layout.

5. The interface display method according to claim 1, wherein the switching the first target page to be displayed in the child window comprises:
  switching the first target page to be displayed in the child window according to a pre-configured display size of the first target page in the child window.

6. The interface display method according to claim 1, wherein the creating the child window displayed independently of the window comprises:
  acquiring an initial display position and an initial display size of the child window; and
  creating, according to the initial display size, the child window displayed independently of the window at the initial display position.

7. The interface display method according to claim 6, wherein after switching the first target page to be displayed in the child window, the method further comprises:
  in response to at least one of a position movement operation and a size adjustment operation for the child window, adjusting at least one of a display position and a display size of the child window in the graphical user interface.

8. The interface display method according to claim 7, further comprising:

recording at least one of the adjusted display position and the adjusted display size of the child window in the graphical user interface; and updating at least one of the initial display position and the initial display size of the child window according to at least one of the adjusted display position and the adjusted display size.

9. The interface display method according to claim 1, wherein the creating the child window displayed independently of the window comprises:

creating multiple child windows displayed independently of the window;

the adding the root element of the first target page to the child window comprises:

adding the root element of the first target page to each of the child windows.

10. The interface display method according to claim 9, further comprising:

in response to an editing operation form a user for a child window of the multiple child windows, determining target display information corresponding to the editing operation; and synchronously displaying the target display information in other child windows of the multiple child windows.

11. The interface display method according to claim 1, wherein the switching the first target page to be displayed in the child window comprises:

acquiring a first display state in the child window that is pre-configured for each control in a layout of the first target page; and switching the first target page to be displayed in the child window according to the first display state of each control in the child window.

12. The interface display method according to claim 1, wherein after switching the first target page to be displayed in the child window, the method further comprises:

in response to a second triggering operation for a preset control in the child window, acquiring a second display state that is pre-configured for each control in a layout of the first target page and is associated with the preset control in the child window; and updating a page displayed in the child window according to the second display state of each control in the child window.

13. The interface display method according to claim 1, wherein after switching the first target page to be displayed in the child window, the method further comprises:

in response to a third triggering operation for a second target page in the child window, acquiring a second layout of the second target page in the child window;

removing a root element of the second target page in the child window from the second layout; and switching the second target page in the child window to be displayed in the window of the graphical user interface, by adding the root element of the second target page in the child window to the first layout.

14. The interface display method according to claim 13, wherein the switching the second target page in the child window to be displayed in the window of the graphical user interface comprises:

acquiring a third display state of each control, in the layout corresponding to the first target page, in a window of the first target page; and switching the second target page in the child window to be displayed in the window of the graphical user interface according to the third display state of each control in the window of the first target page.

15. The interface display method according to claim 1, wherein any one of the triggering operation comprises at least one of a touch operation, a voice operation, and a gesture operation.

16. An interface display method, comprising:

in response to a first triggering operation for a first target page in a floating window of a graphical user interface, acquiring a first layout of the first target page;

removing a root element of the first target page from the first layout, wherein the root element comprises a layout container for configuring the first layout;

creating a target window corresponding to the floating window; and switching the first target page to be displayed in the target window by adding the root element of the first target page to a layout corresponding to the target window.

17. The interface display method according to claim 16, wherein the acquiring the first layout of the first target page comprises:

acquiring a first layout that is pre-created for the root element of the first target page and is in the floating window.

18. The interface display method according to claim 16, wherein the switching the first target page to be displayed in the target window comprises:

acquiring a first display state in the target window that is pre-configured for each control in a layout corresponding to the first target page; and switching the first target page to be displayed in the target window according to the first display state of each control in the target window.

19. The interface display method according to claim 16, wherein after switching the first target page to be displayed in the target window, the method further comprises:

in response to a second triggering operation for a second target page in the target window, acquiring a second layout of the second target page in the target window;

removing a root element of the second target page in the target window from the second layout; and switching the second target page in the target window to be displayed in the floating window, by adding the root element of the second target page in the target window to the first layout, wherein the switching the second target page in the target window to be displayed in the floating window comprises:

acquiring a second display state of each control, in a layout corresponding to the first target page, in the floating window; and switching the second target page to be displayed in the floating window according to the second display state of each control in the floating window.

20. An electronic device, comprising:

one or more processors; and a storage device, configured to store one or more programs which, when executed by the one or more processors, cause the one or more processors to implement operations of:

responding to a first triggering operation for a first target page in a window of a graphical user interface, and acquiring a first layout of the first target page;

removing a root element of the first target page from the first layout, wherein the root element comprises a layout container for configuring the first layout;

creating a child window displayed independently of the window; and switching the first target page to be displayed in the child window by adding the root element of the first target page to a second layout corresponding to the child window.

\* \* \* \* \*